United States Patent
Tochigi et al.

(10) Patent No.: US 7,824,044 B2
(45) Date of Patent: Nov. 2, 2010

(54) ANTIGLARE FILM AND TRANSMISSIVE LIQUID CRYSTAL DISPLAY

(75) Inventors: Yusuke Tochigi, Tokyo (JP); Tomo Yoshinari, Tokyo (JP); Kae Takahashi, Tokyo (JP); Hisamitsu Kameshima, Tokyo (JP)

(73) Assignee: Toppan Printing Co., Ltd. (JP)

(*) Notice: Subject to any disclaimer, the term of this patent is extended or adjusted under 35 U.S.C. 154(b) by 337 days.

(21) Appl. No.: 12/001,922

(22) Filed: Dec. 12, 2007

(65) Prior Publication Data

US 2009/0002832 A1   Jan. 1, 2009

(30) Foreign Application Priority Data

Jun. 27, 2007   (JP) ................ 2007-168579

(51) Int. Cl.
G02B 27/00 (2006.01)
G02B 5/02 (2006.01)

(52) U.S. Cl. ....................... 359/601; 359/599

(58) Field of Classification Search ............... 359/599, 359/601

See application file for complete search history.

(56) References Cited

U.S. PATENT DOCUMENTS

| | | | | |
|---|---|---|---|---|
| 6,217,176 | B1* | 4/2001 | Maekawa | 359/601 |
| 6,710,923 | B2* | 3/2004 | Ito | 359/599 |
| 7,542,118 | B2* | 6/2009 | Miyauchi et al. | 349/137 |
| 2008/0186582 | A1* | 8/2008 | Matsuura et al. | 359/601 |

FOREIGN PATENT DOCUMENTS

| | | |
|---|---|---|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

*Primary Examiner*—Thong Nguyen
(74) *Attorney, Agent, or Firm*—Squire, Sanders & Dempsey L.L.P.

(57) ABSTRACT

An antiglare film satisfies both (1) high antiglare property in the front direction and (2) absence of white blurring. One embodiment of the invention is an antiglare film provided with an antiglare layer on a transparent substrate, wherein the antiglare layer has a rugged structure on the surface opposite to the transparent substrate; the 5° reflectance of the antiglare film surface on the antiglare layer side is in a range of from 0.30% to 0.70%; the antiglare film surface on the antiglare layer side is provided with a rugged structure having arithmetic average roughness ($Ra_1$) in the range of from 0.020 μm to 0.040 μm when a cutoff wavelength ($\lambda_C$) is 0.008 mm; and the antiglare film surface on the antiglare layer side is provided with a rugged structure having arithmetic average roughness ($Ra_2$) in the range of from 0.35 μm to 0.45 μm when a cutoff wavelength ($\lambda_C$) is 0.8 mm.

4 Claims, 5 Drawing Sheets

ANTIGLARE FILM AND TRANSMISSIVE LIQUID CRYSTAL DISPLAY

CROSS REFERENCE

This application claims priority to Japanese application number 2007-168579, filed on Jun. 27, 2007, which is incorporated by reference.

BACKGROUND OF THE INVENTION

1. Field of the Invention

This invention relates to an antiglare film to be provided on the surface of windows, displays and the like. In particular, the invention relates to an antiglare film to be provided on the surface of a display such as a liquid crystal display (LCD), a CRT display, an organic electroluminescence display (ELD), a plasma display (PDP), a surface-conduction electron-emitter display (SED), and a field-emission display (FED).

2. Description of the Related Art

In a display such as a liquid crystal display, a CRT display, an EL display and a plasma display, in order to prevent a reduction in visibility caused by outside light shining onto the surface of the display during viewing and listening, it is known to provide an antiglare film having a rugged structure on the surface of the display.

For antiglare films, for example, the following techniques are known:

a technique in which a rugged structure is formed on the surface of an antiglare film by an embossing method; and a technique in which a rugged structure is formed on the surface of an antiglare film by coating a coating liquid prepared by mixing particles in a binder matrix-forming material to disperse the particles in the binder matrix.

In the antiglare film having a surface with a rugged structure, because of the scattering of the outside light incident on the antiglare film by the rugged structure on the film surface, the image of the outside light becomes unclear, thereby making it possible to prevent a reduction of visibility caused by shining of outside light onto the display surface.

Here, for an antiglare film with irregularity formed by embossing on the surface, the surface irregularity can be controlled completely. Therefore, reproducibility is good. However, there is a problem that, if there is a defect or a foreign material on an embossing roller, endlessly repeating defects will appear on the surface at the pitch of the roller.

On the other hand, antiglare films using a binder matrix and particles are produced with a smaller processing number than that for antiglare films using the above-described embossing. Therefore, it can be produced at a low cost. Thus, many forms of antiglare films prepared by dispersing particles in a binder matrix are known (JP-A-6-18706).

For antiglare films using a binder matrix and particles, various techniques have been disclosed, including, for example, the following techniques:

a technique in which a binder matrix resin and the combination of spherical particles and indefinite-form particles are used together (JP-A-2003-260748);

a technique in which a binder matrix resin and plural types of particles having different particle sizes are used (JP-A-2004-004777);

a technique in which surface irregularity is employed, wherein the cross-section area of the concave portion is defined (JP-A-2003-004903).

Further, the following techniques are also disclosed:

a technique in which the combination of internal scattering and surface scattering is employed to give an antiglare layer having internal haze (cloudiness) of 1-15% and surface haze (cloudiness) of 7-30% (JP-A-11-305010);

a technique in which a binder resin and particles having particle diameters of from 0.5 to 5 μm are employed, wherein the difference between the refraction index of the resin and that of the particle is determined to be from 0.02 to 0.2 (JP-A-11-326608);

a technique in which a binder resin and particles having particle diameters of from 1 to 5 μm are employed, wherein the difference between the refraction index of the resin and that of the particle is determined to be from 0.05 to 0.15. In addition, a solvent to be used, surface roughness and the like are determined to be within a certain range (JP-A-2000-338310);

a binder resin and plural types of particles are employed, wherein the difference between the refraction index of the resin and that of the particle is determined to be from 0.03 to 0.2 (JP-A-2000-180611); and a technique in which, for the purpose of lowering the reduction in contrast, change of hue and the like upon changing a viewing angle, the surface haze (cloudiness) is determined to be 3 or higher, and the difference between the haze value in the normal direction and the haze value in ±60° directions is determined to be 4 or lower (JP-A-11-160505).

As described above, there are disclosed antiglare films having various structures for various purposes.

The performance of an antiglare film used for the front of a display varies depending on situations and displays. In other words, the optimum antiglare film varies depending on the resolution and intended use of a display. Accordingly, a variety of antiglare films are required in accordance with intended uses.

Regarding displays used for a monitor of notebook computers or desktop personal computers, users often watch a display screen from the front direction for a long period of time. Therefore, for an antiglare film used for a monitor display of notebook computers or desktop personal computers, such antiglare films are required that (1) they have high antiglare property capable of making images of outside light, which is incident on the surface of a display in the perpendicular direction (that is, in the front direction to the display screen), unclear, to prevent the shining of an image of the outside light, and (2) they are not accompanied with such phenomenon as fading (white blurring) upon the incidence of outside light, in particular illuminating light from a fluorescent lamp etc., onto the display surface.

SUMMARY OF THE INVENTION

The present invention aims to provide an antiglare film that satisfies both (1) high antiglare property in the front direction and (2) absence of white blurring. One embodiment of the invention is an antiglare film having an antiglare layer on a transparent substrate, wherein the antiglare layer has a rugged structure on the surface opposite to the transparent substrate; the 5° reflectance of the antiglare film surface on the antiglare layer side is in a range of from 0.30% to 0.70%; the antiglare film surface on the antiglare layer side is provided with a rugged structure having arithmetic average roughness ($Ra_1$) in the range of from 0.020 μm to 0.040 μm when a cutoff wavelength ($\lambda_C$) is 0.008 mm; and the antiglare film surface on the antiglare layer side is provided with a rugged structure having arithmetic average roughness ($Ra_2$) in the range of from 0.35 μm to 0.45 μm when a cutoff wavelength ($\lambda_C$) is 0.8 mm.

BRIEF DESCRIPTION OF THE DRAWINGS

FIGS. 4(*a*), 4(*b*) are a transmissive liquid crystal display that uses the antiglare film of the invention.

| Description of Numerals and Symbols | |
|---|---|
| 1 | antiglare film |
| 11 | transparent substrate |
| 12 | antiglare layer |
| 120 | binder matrix |
| 12A | particle A |
| 12B | particle B |
| $r_A$ | average particle diameter of the particle A |
| $r_B$ | average particle diameter of the particle B |
| $r_{C1}$ | average particle diameter of primary particles for particle C |
| $r_{C2}$ | average particle diameter of the particle C in an aggregated form (average particle diameter of secondary particles) |
| H | average thickness of an antiglare layer |
| 2 | polarizing plate |
| 21 | transparent substrate |
| 22 | transparent substrate |
| 23 | polarizing layer |
| 3 | liquid crystal cell |
| 41 | transparent substrate |
| 42 | transparent substrate |
| 43 | polarizing layer |
| 5 | backlight unit |
| 30 | die head |
| 31 | piping |
| 32 | tank for coating liquid |
| 33 | liquid feed pump |
| 35 | rotating roll |

DESCRIPTION OF THE PREFERRED EMBODIMENTS

Figure 1:
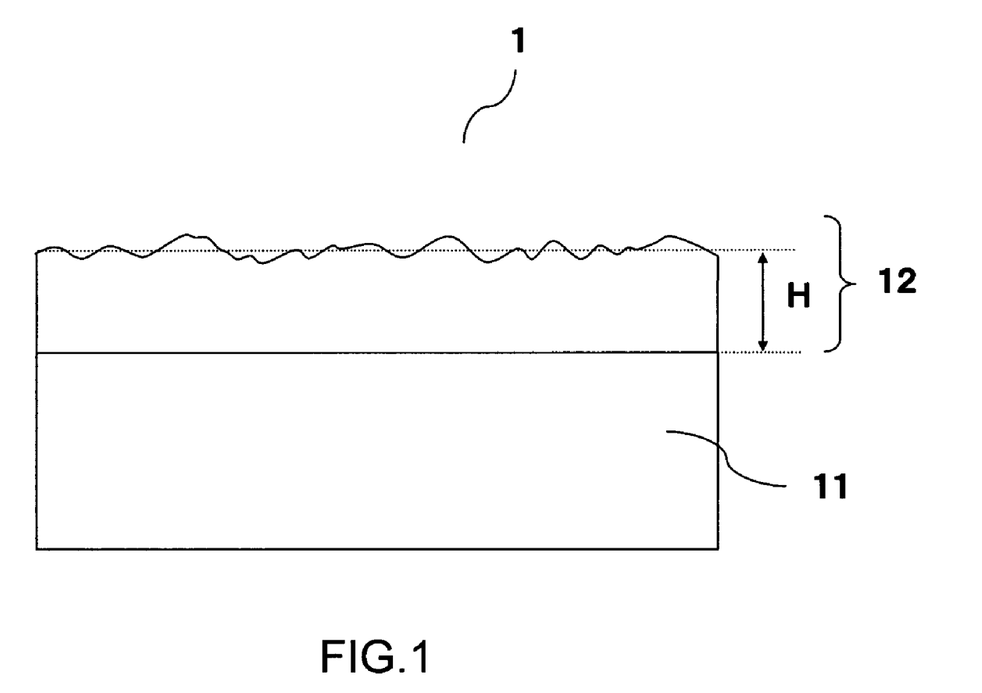
FIG. 1 is a schematic cross-sectional view of the antiglare film of the present invention.

The antiglare film of the present invention is described. FIG. 1 shows a schematic cross-sectional view of the antiglare film of the invention. The antiglare film of the invention is provided with an antiglare layer on a transparent substrate, and the antiglare layer surface on the side opposite to the transparent substrate is provided with a rugged structure. And, the antiglare film of the invention is characterized in that (a) the 5° reflectance of the antiglare film surface on the antiglare layer side is in a range of from 0.30% to 0.70%; (b) the antiglare film surface on the antiglare layer side is provided with a rugged structure having arithmetic average roughness ($Ra_1$) in a range of from 0.020 μm to 0.040 μm when a cutoff wavelength ($\lambda_C$) is 0.008 mm; and (c) the antiglare film surface on the antiglare layer side is provided with a rugged structure having arithmetic average roughness ($Ra_2$) in a range of from 0.35 μm to 0.45 μm when a cutoff wavelength ($\lambda_C$) is 0.8 mm.

An antiglare film serves to diffuse outside light incident on the surface of the antiglare film and to make the image of the outside light shining onto the antiglare film surface unclear, by being provided with a rugged structure on the antiglare layer surface. Here, the 5° reflectance of the antiglare film surface is determined by making light from a light source be incident on the surface of the antiglare film in a direction tilted 5° from the normal direction to the surface and measuring the light amount reflected specularly from the surface. That is, the 5° reflectance of an antiglare film represents the ratio of the reflected light relative to the outside light incident on the antiglare film from the front direction, and it can be said that an antiglare film having a lower 5° reflectance value is provided with a higher antiglare property in the front direction.

Since the antiglare film acts so as to diffuse the outside light incident on the antiglare film surface and make the image of outside light shining on the antiglare film surface unclear, in order to lower the 5° reflectance, it is necessary to increase the degree of the rugged structure of the antiglare layer surface to diffuse more of the outside light incident on the antiglare layer surface. However, a too great degree of the rugged structure of the antiglare film surface results in too much diffusion of the outside light at the antiglare film surface. That is, such phenomenon as fading (white blurring) occurs when illumination of a fluorescent lamp etc. as the outside light is incident on the antiglare film surface. Thus, in the antiglare film, the high antiglare property has a trade-off relation with respect to the absence of the white blurring, and it was difficult to satisfy the two.

By dividing the rugged structure of the antiglare film surface, which influences the antiglare property of the antiglare film, into an arithmetic average roughness $Ra_1$ when a cutoff wavelength $\lambda_c$ is 0.008 mm and an arithmetic average roughness $Ra_2$ when a cutoff wavelength $\lambda_c$ is 0.8 mm, and setting each of these within a predetermined range, the present inventors could form an antiglare film that can diffuse effectively the outside light incident on the antiglare film surface, is provided with high antiglare property and shows no white blurring.

That is, the antiglare film of the invention having the 5° reflectance in a range of from 0.30% to 0.70% is provided with fine roughness represented by arithmetic average roughness ($Ra_1$) when a cutoff wavelength is 0.008 mm, and large roughness represented by arithmetic average roughness ($Ra_2$) when a cutoff wavelength is 0.8 mm, and thus can diffuse effectively outside light incident on the antiglare film with the fine roughness and the large roughness. In addition, the antiglare film of the invention can be an antiglare film showing no white blurring, although it has such high antiglare property as the 5° reflectance of 0.70% or less in the front direction.

In an antiglare film, it can be an antiglare film having high antiglare property in the front direction when the 5° reflectance is made to be 0.70% or less, however it tends to generate white blurring. Here, the antiglare film of the invention is characterized in that, in addition to determine the 5° reflectance to be 0.70% or less, the arithmetic average roughness ($Ra_1$) of the antiglare film surface is made to be 0.040 μm or less when the cutoff wavelength is 0.008 mm or less, and the arithmetic average roughness ($Ra_2$) is made to be 0.45 μm or less when the cutoff wavelength is 0.8 mm. In other words, by controlling the degree of fine roughness represented by the arithmetic average roughness ($Ra_1$) when the cutoff wavelength is 0.008 mm, and the degree of large roughness represented by the arithmetic average roughness ($Ra_2$) when the cutoff wavelength is 0.8 mm, it is possible to form an antiglare film that shows no white blurring, although it has the 5° reflectance of 0.7% or less and is provided with high antiglare property in the front direction.

In the case of the antiglare film of the invention, it is possible to prevent white blurring by controlling the degree of fine roughness represented by the arithmetic average roughness ($Ra_1$) when the cutoff wavelength is 0.008 mm and the degree of large roughness represented by the arithmetic average roughness ($Ra_2$) when the cutoff wavelength is 0.8 mm, respectively, to diffuse effectively outside light incident on the antiglare layer. In the invention, there is no such phenomenon that either of the rugged structures of the fine roughness and large roughness is too much to diffuse excessively outside light incident on the antiglare layer from the front direction to result in the occurrence of white blurring.

In other words, by setting all three parameters, that is, (a) the 5° reflectance of the antiglare film surface, (b) the arithmetic average roughness ($Ra_1$) of the antiglare film surface when the cutoff wavelength ($\lambda_c$) is 0.008 mm, and (c) the arithmetic average roughness ($Ra_2$) of the antiglare film surface when the cutoff wavelength ($\lambda_c$) is 0.8 mm, within the respective predetermined ranges, the antiglare film satisfies both high antiglare property and the absence of white blurring.

If the 5° reflectance of the antiglare film surface exceeds 0.70% in an embodiment of the invention, an antiglare film provided with high antiglare property in the front direction can not be formed. In case where the 5° reflectance of an antiglare film is less than 0.30%, although it is possible to form an antiglare film provided with high antiglare property in the front direction, white blurring occurs when the illumination of a fluorescent lamp etc. is shone onto the antiglare film surface.

In case where the arithmetic average roughness ($Ra_1$) of the antiglare film surface when the cutoff wavelength ($\lambda_c$) is 0.008 mm exceeds 0.040 µm, white blurring occurs when the illumination of a fluorescent lamp etc. is shone onto the antiglare film surface. On the other hand, in case where the arithmetic average roughness ($Ra_1$) of the antiglare film surface when the cutoff wavelength ($\lambda_c$) is 0.008 mm is less than 0.020 µm, it becomes difficult to make the 5° reflectance 0.70% or less, and an antiglare film provided with high antiglare property can not be formed.

Further, in case where the arithmetic average roughness ($Ra_2$) of the antiglare film surface when the cutoff wavelength ($\lambda_c$) is 0.8 mm exceeds 0.45 µm, white blurring occurs when the illumination of a fluorescent lamp etc. is shone onto the antiglare film surface. On the other hand, in case where the arithmetic average roughness ($Ra_2$) of the antiglare film surface when the cutoff wavelength ($\lambda_c$) is 0.8 mm is less than 0.35 µm, it becomes difficult to make the 5° reflectance 0.70% or less, and an antiglare film provided with high antiglare property can not be formed.

In the present invention, the 5' reflectance of the antiglare film surface is the reflectance in the direction tilted 5° from the normal direction to the antiglare layer surface, and can be measured with a reflectance measuring apparatus. The arithmetic average roughness ($Ra_1$) of the antiglare film surface when the cutoff wavelength ($\lambda_c$) is 0.008 mm, and the arithmetic average roughness ($Ra_2$) of the antiglare film surface when the cutoff wavelength ($\lambda_c$) is 0.8 mm are measured on the basis of Japanese Industrial Standards JIS-B0601-1994.

In the invention, it is possible to incorporate particles in a binder matrix, and to form the rugged structure onto the antiglare layer surface with the particles. On this occasion, by employing particles A and particles B having average particle diameters different from each other as constituent materials for the antiglare layer, it becomes possible to set easily all three parameters, that is, (a) the 5° reflectance of the antiglare film surface, (b) the arithmetic average roughness ($Ra_1$) of the antiglare film surface when the cutoff wavelength ($\lambda_c$) is 0.008 mm, and (c) the arithmetic average roughness ($Ra_2$) of the antiglare film surface when the cutoff wavelength ($\lambda_c$) is 0.8 mm, within the respective predetermined ranges. Further, also by employing particles C in an aggregated figure formed by the aggregation of primary particles as a constituent material for the antiglare layer, it becomes possible to set easily all three parameters, that is, (a) the 5° reflectance of the antiglare film surface, (b) the arithmetic average roughness ($Ra_1$) of the antiglare film surface when the cutoff wavelength ($\lambda_c$) is 0.008 mm, and (c) the arithmetic average roughness ($Ra_2$) of the antiglare film surface when the cutoff wavelength ($\lambda_c$) is 0.8 mm, within the respective predetermined ranges.

Hereinafter, constituents of two antiglare films of the invention, that is, in the case where the particles A and the particles B are employed as the constituent materials for the antiglare layer, and in the case where the particles C are employed as the constituent material for the antiglare layer, are shown.

Figure 2:
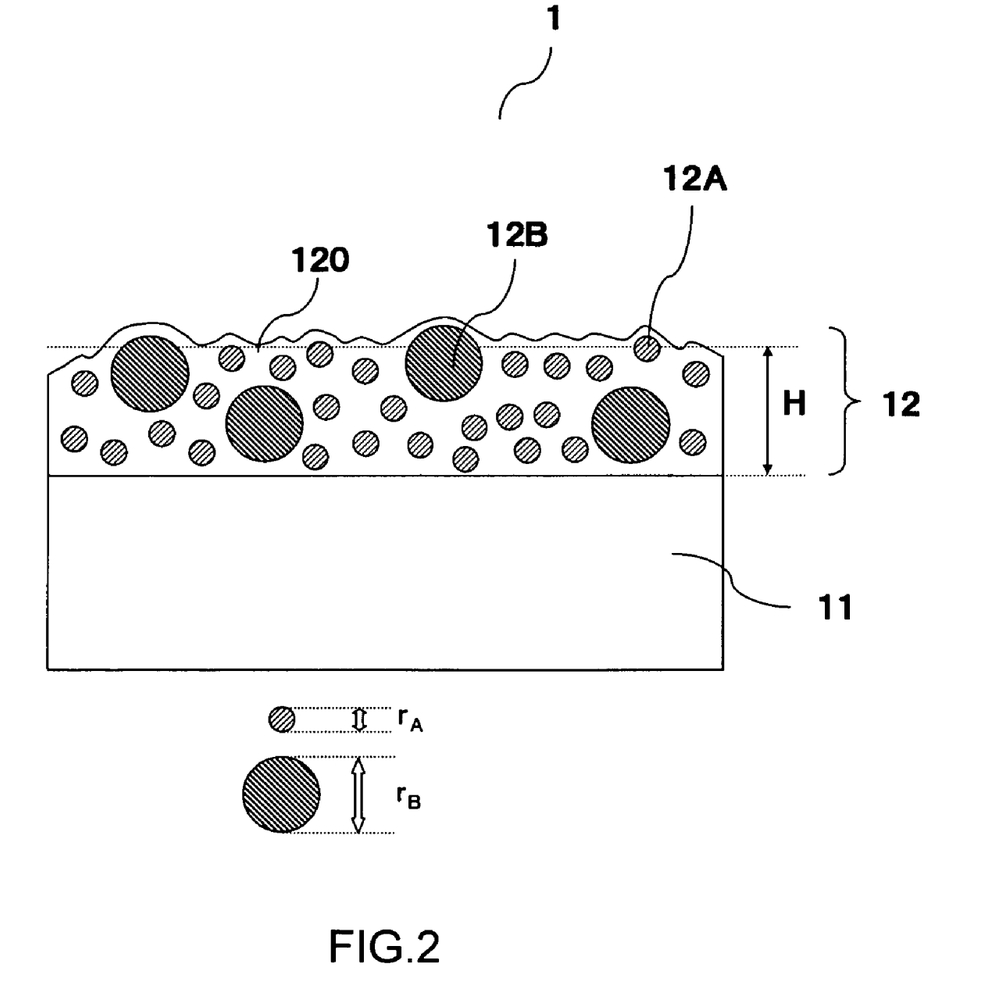
FIG. 2 is a schematic cross-sectional view of the antiglare film of the invention when a particle A and a particle B are used as antiglare layer-forming materials.

The antiglare film of the invention may be an antiglare film, in which the particles A and the particles B are employed as antiglare layer constituent materials. FIG. 2 shows a schematic cross-sectional view of the antiglare film of the invention when the particles A and the particles B are employed as constituent materials for the antiglare layer. The constituent, in which the particles A and the particles B are employed in the antiglare film according to the invention, is characterized in that the antiglare layer of the antiglare film contains a binder matrix, the particles A and the particles B, wherein the average particle diameter ($r_A$) of the particles A is in the range of from a value obtained by multiplying the average thickness (H) of the antiglare layer by 0.20 to a value obtained by multiplying the average thickness (H) of the antiglare layer by 0.40, and the average particle diameter ($r_B$) of the particles B is in the range of from a value obtained by multiplying the average thickness (H) of the antiglare layer by 0.60 to the average thickness (H) of the antiglare layer.

By incorporating the particles A and the particles B having average particle diameters sufficiently different from each other in the binder matrix to form irregularity on the antiglare layer surface, it becomes possible to produce easily an antiglare film in which the all of (a) the 50 reflectance of the antiglare film surface, (b) the arithmetic average roughness ($Ra_1$) of the antiglare film surface when the cutoff wavelength ($\lambda_C$) is 0.008 mm, and (c) the arithmetic average roughness ($Ra_2$) of the antiglare film surface when the cutoff wavelength ($\lambda_C$) is 0.8 mm are within the respective predetermined ranges.

On this occasion, the particles A, which have the average particle diameter in the range of from a value obtained by multiplying the average thickness (H) of the antiglare layer by 0.20 to a value obtained by multiplying the average thickness (H) of the antiglare layer by 0.40, contribute mainly to form fine irregularity having the arithmetic average roughness ($Ra_1$) in the range of from 0.020 µm to 0.040 µm when the cutoff wavelength ($\lambda_c$) is 0.008 mm on the antiglare layer surface. On the other hand, the particles B, which have the average particle diameter in the range of from the value obtained by multiplying the average thickness (H) of the antiglare layer by 0.60 to the average thickness (H) of the antiglare layer, contribute mainly to form large irregularity having the arithmetic average roughness ($Ra_2$) in the range of from 0.35 µm to 0.45 µm when the cutoff wavelength ($\lambda_c$) is 0.8 mm on the antiglare layer surface.

In other words, the particles A can easily form such fine irregularity on the antiglare layer surface that gives the arithmetic average roughness ($Ra_1$) in the range of from 0.020 μm to 0.040 μm when the cutoff wavelength ($\lambda_C$) is 0.008 mm, and the particles B can easily form such large irregularity on the antiglare layer surface that gives the arithmetic average roughness ($Ra_2$) in the range of from 0.35 μm to 0.45 μm when the cutoff wavelength ($\lambda_C$) is 0.8 mm. The rugged structure of the antiglare layer surface formed by the particles A and the particles B can effectively diffuse the outside light incident on the antiglare layer.

In the invention, the average thickness (H) of the antiglare layer means an average value of the thickness of an antiglare layer having surface irregularity. The average thickness can be obtained with an electronic micrometer or a full automatic fine figure measuring apparatus. The average particle diameters ($r_A$, $r_B$) of the particles A and the particles B for use in the invention can be obtained with a light scattering type particle diameter distribution measuring apparatus.

Figure 3:
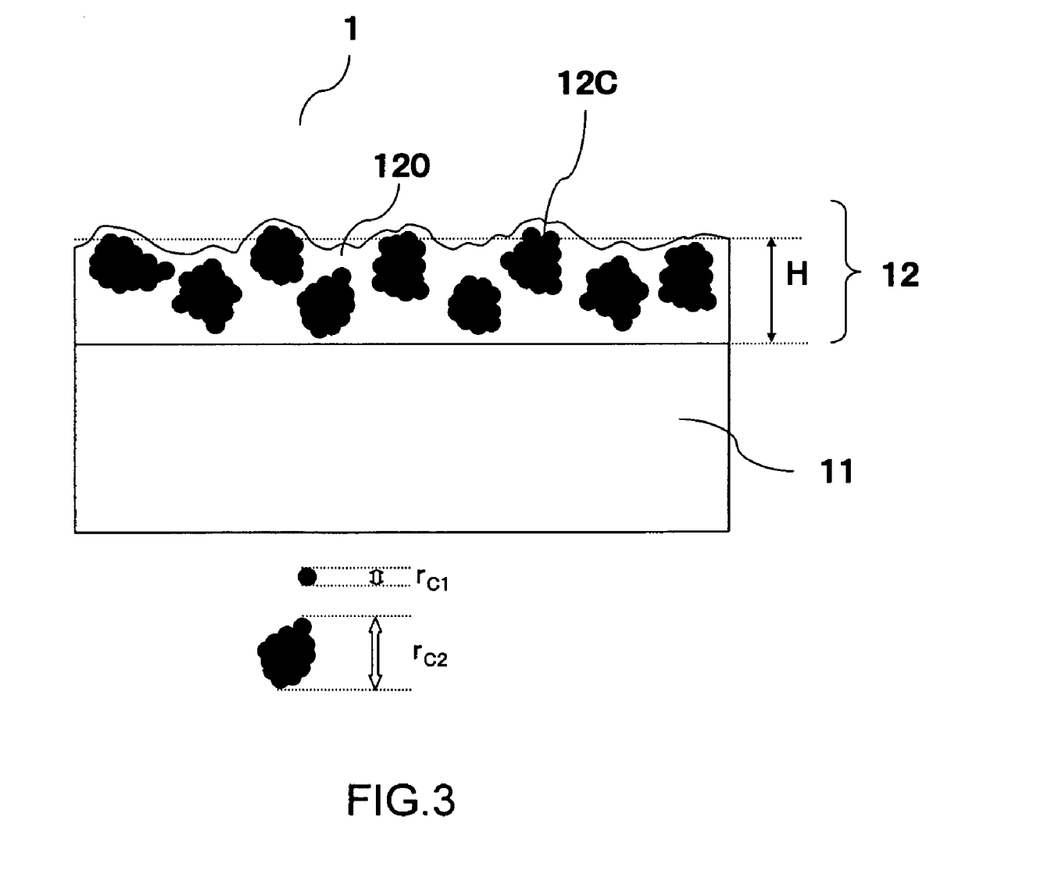
FIG. 3 is a schematic cross-sectional view of the antiglare film of the invention when a particle C is used as an antiglare layer-forming material.

Next, an antiglare film of the present invention includes particles C that are aggregated figures formed by the aggregation of primary particles that are employed as an antiglare layer on material. FIG. 3 shows a schematic cross-sectional view of the antiglare film of the present invention when the particles C are employed as a constituent material for the antiglare layer. The constitution, in which the particles C having an aggregated figure formed by the aggregation of primary particles is employed in the antiglare film according to the present invention, is characterized in that the average particle diameter ($r_{C1}$) of the primary particles is in the range of from 0.005 μm to 0.03 μm, and the average particle diameter of the particles C having an aggregated figure (that is, the average particle diameter ($r_{C2}$) of the secondary particles of the particles C) is in the range of a value obtained by multiplying the average thickness (H) of the antiglare layer by 0.35 to a value obtained by multiplying the average thickness (H) of the antiglare layer by 0.80.

By incorporating the particles C, which are formed through the aggregation of primary particles, in the binder matrix to form irregularity on the antiglare layer surface, it becomes possible to produce easily the antiglare film in which the all of (a) the 5° reflectance of the antiglare film surface, (b) the arithmetic average roughness ($Ra_1$) of the antiglare film surface when the cutoff wavelength ($\lambda_c$) is 0.008 mm, and (c) the arithmetic average roughness ($Ra_2$) of the antiglare film surface when the cutoff wavelength ($\lambda_c$) is 0.8 mm, are within respective predetermined ranges.

On this occasion, since the particles C are aggregated figures formed by the aggregation of primary particles, the film is provided with a fine rugged structure on the surface thereof. Thus, the primary particles for the particles C, which have the average particle diameter of from 0.005 μm to 0.03 μm, form irregularity on the surface of the particles C, to contribute mainly to form the fine irregularity having the arithmetic average roughness ($Ra_1$) that falls within the range of from 0.020 μm to 0.040 μm when the cutoff wavelength ($\lambda_c$) is 0.008 mm on the antiglare layer surface.

In addition, the particles C in aggregated figures, which have the average particle diameter within the range of a value obtained by multiplying the average thickness (H) of the antiglare layer by 0.35 to a value obtained by multiplying the average thickness of the antiglare layer by 0.80, contribute to form large irregularity that gives the arithmetic average roughness ($Ra_2$) in the range of from 0.35 μm to 0.45 μm when the cutoff wavelength ($\lambda_c$) is 0.8 mm.

In other words, the particles C can easily form, by the rugged structure on the surfaces of the particles C formed by primary particles and the particles C themselves (secondary particle) composed of the aggregated primary particles, fine irregularity that results in the arithmetic average roughness ($Ra_1$) within the range of from 0.020 μm to 0.040 μm when the cutoff wavelength ($\lambda_C$) is 0.008 mm, and large irregularity that results in the arithmetic average roughness ($Ra_2$) falling within the range of from 0.35 μm to 0.45 μm when the cutoff wavelength ($\lambda_C$) is 0.8 mm, respectively, on the antiglare layer surface. Thus, the rugged structure on the antiglare layer surface formed with the particles C can effectively diffuse the outside light incident on the antiglare layer.

To repeat, in the invention, the average thickness (H) of the antiglare layer means an average value of the thickness of an antiglare layer having surface irregularity. The average particle diameter ($r_{C1}$) of the primary particles for the particles C and the average particle diameter ($r_{C2}$) of the particles C in aggregated figures for use in the invention are obtained with a light scattering type particle diameter distribution measuring apparatus.

The antiglare film of the present invention is provided with a functional layer having antireflection performance, antistatic performance, antifouling performance, electromagnetic wave shielding performance, infrared absorption performance, ultraviolet absorption performance or color correction performance, according to need. Such functional layers include an antireflection layer, an antistatic layer, an antifouling layer, an electromagnetic wave shielding layer, an infrared absorption layer, an ultraviolet absorption layer and a color correction layer. These functional layers may be composed of a single layer or plural layers. The functional layer may have plural functions in one layer, such as an antireflection layer having antifouling performance. These functional layers may be provided between the transparent substrate and the antiglare layer, or on the antiglare layer. Further, in the present invention, a primer layer or an adhesion layer may be provided between the respective layers in order to improve adhesiveness between the respective types of layers.

Figure 4:
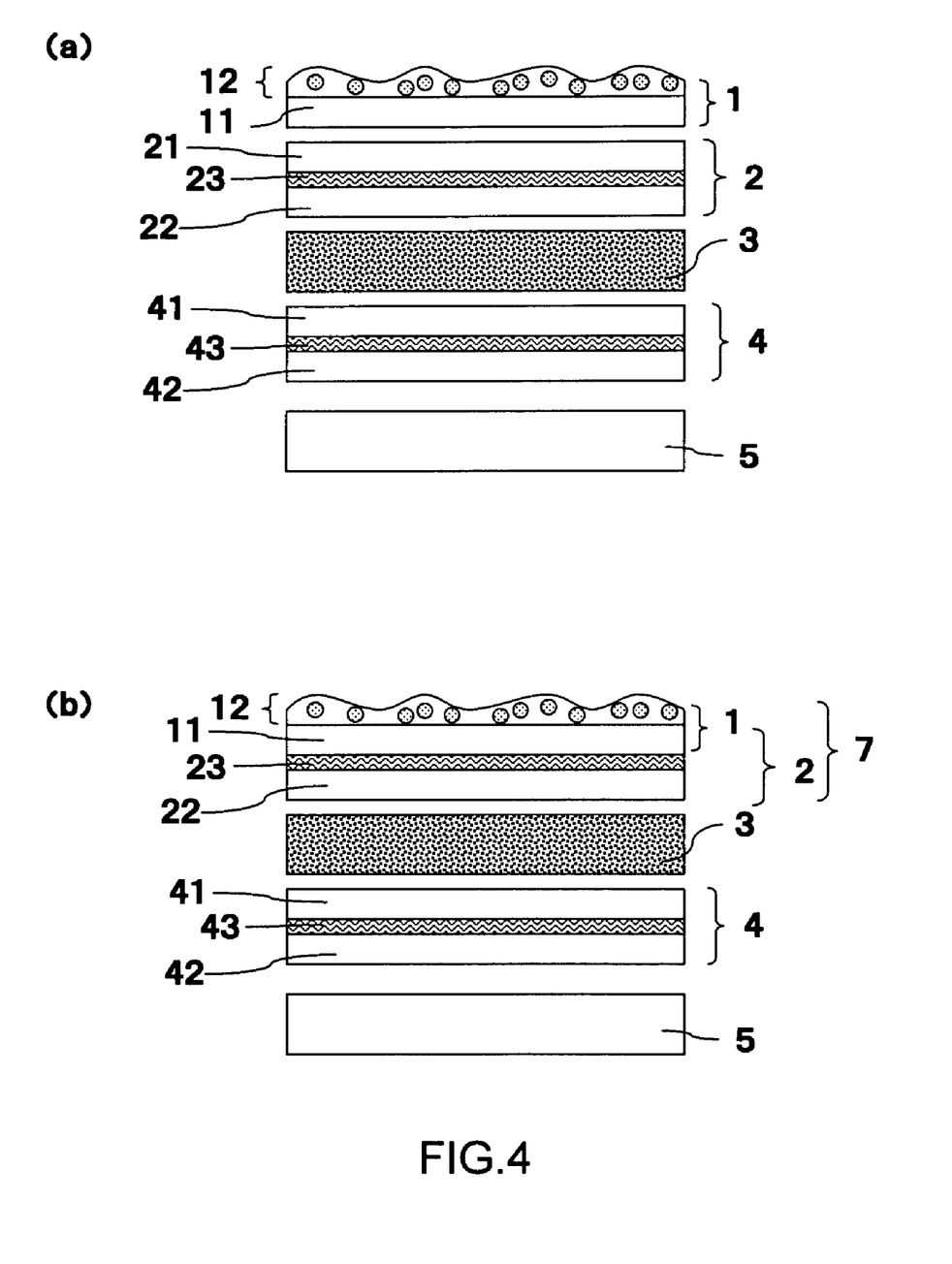

FIG. 4 shows a transmissive liquid crystal display that uses an antiglare film of the present invention. The transmissive liquid crystal display as shown in FIG. 4(a) is provided with a backlight unit (5), a polarizing plate (4), a liquid crystal cell (3), a polarizing plate (2), and an antiglare film (1) in this order. On this occasion, the antiglare film (1) side is the view side, that is, the display surface.

The backlight unit (5) is provided with a light source and a light diffusing plate. In the liquid crystal cell, electrodes are provided on one transparent substrate and electrodes, color filters are provided on the other transparent substrate, and liquid crystal is filled between both electrodes. In the polarizing plates provided so as to hold the liquid crystal cell (3) in between, polarizing layers (23, 43) are interposed between the transparent substrates (21, 22, 41, 42), respectively.

In FIG. 4(a), the transmissive liquid crystal display is separately provided with a transparent substrate (11) for the antiglare film (1) and a transparent substrate for the polarizing plate (2). On the other hand, in FIG. 4(b), the transparent substrate (11) for the antiglare film (1) is provided with a polarizing layer (23) on the side opposite to the antiglare layer so that the transparent substrate (11) serves as both the transparent substrate for the antiglare film (1) and the transparent substrate for the polarizing plate (2).

The transmissive liquid crystal display of the invention may be provided with other functional members. Examples of other functional members include a diffusion film, a prism sheet or a brightness-improving film for utilizing effectively light emitted from a backlight, and a retardation film for compensating for the retardation of a liquid crystal cell or a polarizing plate, but the transmissive liquid crystal display of the present invention is not limited to these.

Next, a method for producing the antiglare film of the present invention is described.

In the method for producing the antiglare film of the present invention, the antiglare layer can be formed on a transparent substrate by processes including a process for coating a coating liquid for forming the antiglare layer containing at least a binder matrix-forming material capable of being cured by an ionizing radiation, the particles A and the particles B on a transparent substrate to form a coated film on the transparent substrate, and a curing process for curing the binder matrix-forming material by ionizing radiation.

Further, in a method for producing the antiglare film of the present invention, it is also possible to form the antiglare layer on a transparent substrate by processes including a process for coating a coating liquid for forming the antiglare layer containing at least a binder matrix-forming material capable of being cured by ionizing radiation and the particles C in aggregated figures formed by the aggregation of primary particles on a transparent substrate to form a coated film on the transparent substrate, and a curing process for curing the binder matrix-forming material by ionizing radiation.

Regarding a transparent substrate for use in the present invention, glass or plastic film may be employed. For the plastic film, one having appropriate transparency and mechanical strength is sufficient. For example, a film of polyethylene terephthalate (PET), triacetyl cellulose (TAC), diacetylcellulose, acetylcellulose butyrate, polyethylene naphthalate (PEN), cycloolefin polymer, polyimide, polyether sulfone (PES), polymethyl methacrylate (PMMA), polycarbonate (PC) and the like may be used. Of these, a triacetyl cellulose film can be preferably used because it has a little birefringence and good transparency. In particular, in case where the antiglare film of the present invention is provided on the surface of a liquid crystal display surface, the use of triacetyl cellulose as a transparent substrate is preferred.

Further, as shown in FIG. 4(b), it is also possible to provide a polarizing layer on the surface of the transparent substrate opposite to the surface on which the antiglare layer is provided. On this occasion, for a polarizing layer, one composed of a stretched polyvinyl alcohol (PVA) added with iodine can be an example. On this occasion, the polarizing layer is held between the transparent substrates.

The antiglare layer-forming coating liquid for forming the antiglare layer contains at least a binder matrix-forming material capable of being cured by an ionizing radiation, the particles A and the particles B. Or, it contains at least a binder matrix-forming material capable of being cured by ionizing radiation and the particles C in aggregated figures formed through the aggregation of primary particles.

On this occasion, for the binder matrix-forming material, an ionizing radiation curable material can be employed. As an ionizing radiation curable material, polyfunctional acrylate such as acrylic ester or methacrylic ester of polyhydric alcohol, or polyfunctional urethane acrylate as is synthesized from diisocyanate, and hydroxy ester of polyhydric alcohol and acrylic acid or methacrylic acid, and the like can be used. In addition to these, as an ionizing radiation curable material, polyether resin having an acrylate-based functional group, polyester resin, epoxy resin, alkyd resin, spiroacetal resin, polybutadiene resin, polythiol polyene resin and the like may be used.

Of these, for a binder matrix-forming material, the use of trifunctional acrylate monomer or tetrafunctional acrylate monomer, which is an ionizing radiation curable material, is preferred. The use of trifunctional acrylate monomer or tetrafunctional acrylate monomer makes it possible to form an antiglare film provided with a sufficient abrasion-resistant property. Specific examples of the trifunctional acrylate monomer and the tetrafunctional acrylate monomer include trifunctional or tetrafunctional monomer among polyfunctional acrylate monomer such as acrylic or methacrylic ester of polyhydric alcohol, and polyfunctional urethane acrylate monomer synthesized from diisocyanate and hydroxy ester of polyhydric alcohol and acrylic or methacrylic acid. On this occasion, the trifunctional acrylate monomer or the tetrafunctional acrylate monomer is preferably used in total 80 wt % or more relative to the binder matrix-forming material.

For the binder matrix-forming material, in addition to an ionizing radiation curable material, thermoplastic resin etc. may also be added. Usable thermoplastic resins include cellulose derivatives such as acetylcellulose, nitrocellulose, acetylbutylcellulose, ethylcellulose, methylcellulose, vinyl-based resins such as vinyl acetate and copolymers thereof, vinyl chloride and copolymers thereof, and vinylidene chloride and copolymer thereof, acetal resins such as polyvinyl formal and polyvinyl butyral, acrylic-based resins such as acrylic resin and copolymers thereof and methacylic resin and copolymers thereof, polystyrene resin, polyamide resin, linear polyester resin, and polycarbonate resin. The addition of thermoplastic resin can improve the adhesiveness between the transparent substrate and the antiglare layer. Further, the addition of thermoplastic resin can control the curl of an antiglare film to be produced.

The particles A and the particles B for use in the present invention are suitably selected from such organic particles as acrylic particles (refraction index: 1.49), acrylic-styrene particles (refraction index: 1.49 to 1.59), polystyrene particles (refraction index: 1.59), polycarbonate particles (refraction index: 1.58), melamine particles (refraction index: 1.66), epoxy particles (refraction index: 1.58), polyurethane particles (refraction index: 1.55), nylon particles (refraction index: 1.50), polyethylene particles (refraction index: 1.50 to 1.56), polypropylene particles (refraction index: 1.49), silicone particles (refraction index: 1.43), polytetrafluoroethylene particles (refraction index: 1.35), polyvinylidene fluoride particles (refraction index: 1.42), polyvinyl chloride particles (refraction index: 1.54) and polyvinylidene chloride particles (refraction index: 1.62), and such inorganic particles as silica particles (refraction index: 1.48), alumina particles (refraction index: 1.76), talc (refraction index: 1.54), various types of aluminosilicates (refraction index: 1.50 to 1.60), kaolin clay (refraction index: 1.53) and MgAl hydrotalcite (refraction index: 1.50). Of these, when the particles A and the particles B are to be used, organic particles can preferably be used. The use of organic particles as the particles A and the particles B provide the antiglare film with high transparency. In the invention, the particles A and the particles B may be composed of the same materials. Preferably the particles A and the particles B are spherical particles. Here, the spherical particles include perfect spherical particles, spheroids and the like.

Moreover, preferably the average particle diameter ($r_A$) of the particles A falls within the range of a value obtained by multiplying the average thickness (H) of the antiglare layer by 0.2 to a value obtained by multiplying the average thickness (H) of the antiglare layer by 0.4, and the average particle diameter ($r_B$) of the particles B falls within the range of a value obtained by multiplying the average thickness (H) of the antiglare layer by 0.6 to the average thickness (H) of the antiglare layer.

The particles C for use in the invention, which have aggregated figures composed of the aggregation of primary particles (fine particles), is suitably selected from such organic particles as acrylic particles (refraction index: 1.49), acrylic-styrene particles (refraction index: 1.49 to 1.59), polystyrene particles (refraction index: 1.59), polycarbonate particles (refraction index: 1.58), melamine particles (refraction index: 1.66), epoxy particles (refraction index: 1.58), polyurethane particles (refraction index: 1.55), nylon particles (refraction index: 1.50), polyethylene particles (refraction index: 1.50 to 1.56), polypropylene particles (refraction index: 1.49), silicone particles (refraction index: 1.43), polytetrafluoroethylene particles (refraction index: 1.35), polyvinylidene fluoride particles (refraction index: 1.42), polyvinyl chloride particles (refraction index: 1.54) and polyvinylidene chloride particles (refraction index: 1.62), and such inorganic particles as silica particles (refraction index: 1.48), alumina particles (refraction index: 1.76), talc (refraction index: 1.54), various types of aluminosilicates (refraction index: 1.50 to 1.60), kaolin clay (refraction index: 1.53) and MgAl hydrotalcite (refraction index: 1.50). Of these, from the viewpoint of versatility of the material, silica particles (refraction index: 1.48) can preferably be used. Further, by using silica particles, the antiglare film to be obtained can be provided with an antiglare layer having higher surface hardness. On this occasion, it is preferred that the average particle diameter ($r_{C1}$) of the primary particles falls within the range of from 0.005 µm to 0.03 µm, and that the average particle diameter ($r_{C2}$) of the particle C in an aggregated figure falls within the range of from a value obtained by multiplying the average thickness (H) of the antiglare layer by 0.3 to a value obtained by multiplying the average thickness (H) of the antiglare layer by 0.6.

When ultraviolet rays are used for ionizing radiation, a photopolymerization initiator is added to the antiglare layer-forming coating liquid. For the photopolymerization initiator, publicly known photopolymerization initiators may be employed, but the use of one that is appropriate to a binder matrix-forming material to be used is preferred. For the photopolymerization initiator, benzoin and alkyl ethers thereof such as benzoin methyl ether, benzoin ethyl ether, benzoin isopropyl ether and benzyl methyl ketal are used. The use amount of the photopolymerization initiator is from 0.5 to 20 wt % relative to the binder matrix-forming material, preferably from 1 to 5 wt %.

To the antiglare layer-forming coating liquid, a solvent is added according to need. By the addition of a solvent, it becomes possible to disperse uniformly the particles and binder matrix, and to adjust the viscosity of the coating liquid within an appropriate range upon coating the antiglare layer-forming coating liquid on a transparent substrate.

In the present invention, when a triacetyl cellulose film is used as a transparent substrate and the antiglare layer is directly provided on the triacetyl cellulose film via no other functional layer, for the solvent of the antiglare layer-forming coating liquid, the use of a mixed solvent of a solvent that dissolves or swells the triacetyl cellulose film and a solvent that does not dissolve or swell the triacetyl cellulose film is preferred. By using the mixed solvent, such antiglare film can be formed that has sufficient adhesiveness at the interface of the triacetyl cellulose film and the antiglare layer.

On this occasion, the solvent that dissolves or swells the triacetyl cellulose film includes ethers such as dibutyl ether, dimethoxymethane, dimethoxyethane, diethoxyethane, propylene oxide, dioxane, dioxolan, trioxane, tetrahydrofuran, anisole and phenetole, selected ketones such as acetone, methyl ethyl ketone, diethyl ketone, dipropyl ketone, diisobutyl ketone, cyclopentanone, cyclohexanone, methylcyclohexanone and ethylcyclohexanone, esters such as ethyl formate, propyl formate, n-pentyl formate, methyl acetate, ethyl acetate, methyl propionate, ethyl propionate, n-pentyl acetate and γ-butyrolactone, and cellosolves such as methyl cellosolve, cellosolve, butyl cellosolve and cellosolve acetate. One of these can be used independently, or two or more can be used in combination.

The solvent that does not dissolve or swell the triacetyl cellulose film includes aromatic hydrocarbons such as toluene, xylene, cyclohexane and cyclohexylbenzene, hydrocarbons such as n-hexane, and selected ketones such as methyl isobutyl ketone and methyl butyl ketone. One of these can be used independently, or two or more can be used in combination.

In the present invention, for the purpose of preventing the occurrence of such defects of the coated film as repellence and unevenness in the antiglare layer (coated film) to be coated and formed, an additive referred to as a surface conditioner may be added. The surface conditioner is also referred to as a leveling agent, a defoaming agent, an interfacial tension conditioner or a surface tension conditioner in accordance with the function thereof, and each of these serves to lower the surface tension of the coated film (antiglare layer) to be formed.

Additives usually used for the surface conditioner include silicone-based additives, fluorine-containing additives and acrylic-based additives. For the silicone-based additive, a derivative is used that has polydimethylsiloxane as the base structure, wherein the side chain of the polydimethylsiloxane structure is modified. For example, polyether-modified dimethylsiloxane is used as a silicone-based additive. For the fluorine-containing additive, compounds provided with a perfluoroalkyl group are used. For the acrylic-based additive, those having a structure formed by polymerizing acrylic monomer, methacrylic monomer or styrene monomer as the base structure are used. Further, the acrylic-based additive may have such structure that is formed by polymerizing acrylic monomer, methacrylic monomer or styrene monomer as the base structure, and that contains such substituent as an alkyl group, a polyether group, a polyester group, a hydroxyl group or an epoxy group in the side chain.

In the case of the antiglare layer-forming coating liquid of the present invention, in addition to the aforementioned surface conditioners, other additives may be added to the coating liquid. However, preferably these additives may not influence the transparency, light-diffusing property and the like of the antiglare layer to be formed. For functional additives, an antistatic agent, an ultraviolet absorber, an infrared absorber, an antifouling agent, a water repellent, a refraction index conditioner, an adhesiveness-improving agent, a hardener and the like may be used. Thereby, it is possible to provide functions other than the antiglare function as antistatic function, ultraviolet-absorbing function, infrared-absorbing function, antifouling function, or water-repelling function to the antiglare layer to be formed.

The antiglare layer-forming coating liquid is coated on a transparent substrate to form a coated film.

Regarding the method for coating the antiglare layer-forming coating liquid on a transparent substrate, coating methods using a roll coater, a reverse roll coater, a gravure coater, a knife coater, a bar coater or a die coater can be employed. Of these, the use of a die coater, which makes high-speed coating in a roll-to-roll system possible, is preferred. The solid concentration of the coating liquid differs depending on the coating method. The solid content may be approximately from 30 to 70% by weight.

Figure 5:
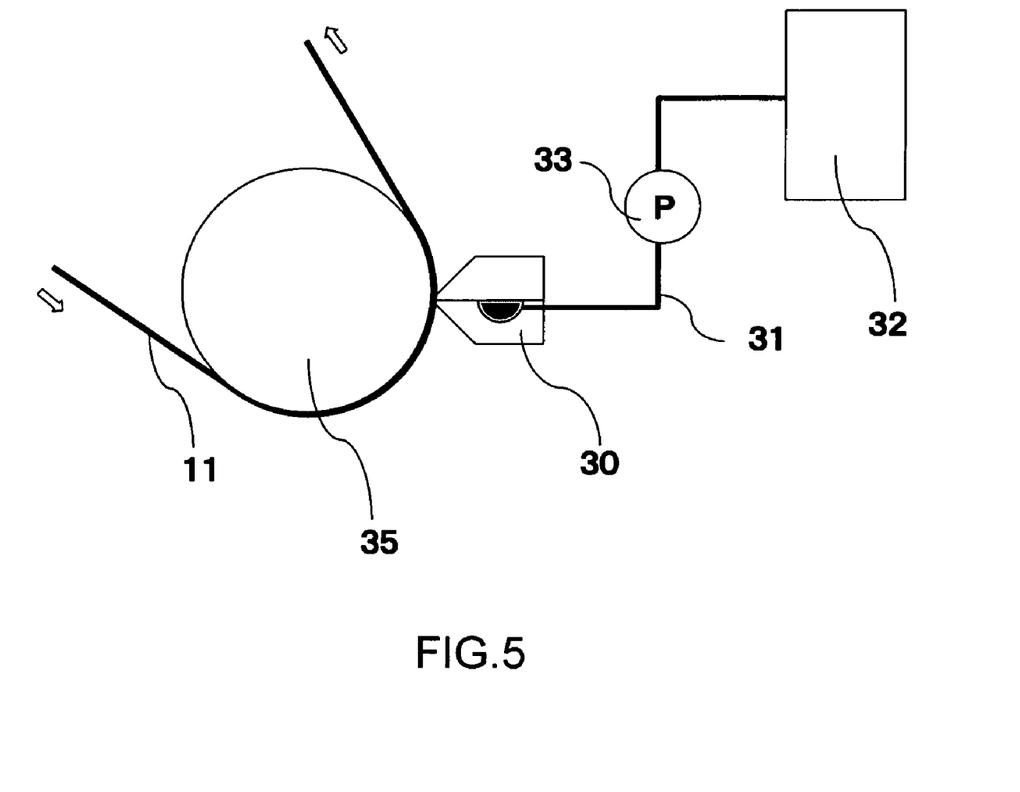
FIG. 5 is a schematic view of a die coater for use in the invention.

Next, a die coater for use in the present invention is described. FIG. 5 shows a schematic view of a die coater in the invention. The die coater in the invention has such structure that a die head 30 is connected to a coating liquid tank 32 with a pipe 31, wherein the antiglare layer-forming coating liquid in the coating liquid tank 32 is fed into the die head 30 with a liquid feed pump 33. The die head 30 discharges the antiglare layer-forming coating liquid fed to it from the slit gap thereof to form a coated film on a transparent substrate 11. By using the windable transparent substrate 11 and a rotating roll 35, it is possible to form continuously the coated film in a roll-to-roll system on the transparent substrate.

By irradiating (using, for example, ionizing radiation) the coated film obtained by coating the coating liquid on the transparent substrate, the antiglare layer is formed. For ionizing radiation, ultraviolet rays or electron beams can be used. In the case of curing with ultraviolet rays, a light source can be utilized such as a high-pressure mercury lamp, a low-pressure mercury lamp, an ultra-high pressure mercury lamp, a metal halide lamp, carbon arc and xenon arc. In the case of curing with electron beams, electron beams emitted from various electron beam accelerators such as a Cockroft-Walton type, a Van de Graaff type, a resonance transform type, an insulated core transformer type, a linear type, a Dinamitron type and a high-frequency type accelerator can be utilized. The electron beam has energy of preferably from 50 to 1000 KeV, more preferably from 100 to 300 KeV.

A drying step may be provided before and after the step of forming the antiglare layer through curing. The curing and the drying may be carried out simultaneously. In particular, when the coating liquid contains a binder matrix material, particles and a solvent, in order to remove the solvent from the coated film formed, it is necessary to provide a drying step before ionizing radiation. For the drying devices, heating, air blasting and hot air blasting are examples.

In the antiglare film of the present invention, the average thickness (H) of the antiglare layer is preferably in the range of from 2 μm to 25 μm. When the average thickness of the antiglare layer is less than 2 μm, the obtained antiglare film may not acquire sufficient hardness that allows the film to be provided on a display surface. On the other hand, when the average thickness of the antiglare layer is greater than 25 μm, the cost becomes high, and the degree of the curling of the obtained antiglare film may be too large such that the film may not be suitable for the processing step for providing the film on a display surface. The more preferred average thickness of the antiglare layer is from 3 μm to 12 μm.

Incidentally, in the invention, in addition to a method of using the particles A and the particles B as an antiglare layer constituent materials and a method of using the particles C in an aggregated state composed of the aggregation of primary particles as the antiglare layer constituent material, an antiglare layer provided with a rugged structure on the surface, wherein the all of (a) the 5° reflectance of the antiglare film surface, (b) the arithmetic average roughness ($Ra_1$) of the antiglare film surface when the cutoff wavelength ($\lambda_c$) is 0.008 mm, and (c) the arithmetic average roughness ($Ra_2$) of the antiglare film surface when the cutoff wavelength ($\lambda_c$) is 0.8 mm are within respective predetermined ranges, may be formed by an emboss process.

By providing an antiglare film with the above-mentioned structure, the antiglare film, which satisfies both (1) high antiglare property in the front direction and (2) the absence of white blurring, can be obtained for use with the monitor display of notebook computers and desktop personal computers.

EXAMPLES

Hereinafter, Examples of the present invention are shown.

Example 1

For a transparent substrate, a triacetyl cellulose film (TD-80U, by FUJIFILM) was used. For an antiglare layer-forming coating liquid, a liquid containing 100 parts by weight of PE3 (pentaerythritol acrylate, by KYOEISHA CHEMICAL), 5 parts by weight of Irgacure 184 (ultraviolet ray polymerization initiator, by Ciba Specialty Chemicals), particles A (acrylic spherical filler) and particles B (acrylic/styrene copolymer spherical filler) as shown in Table 1 and 110 parts by weight of toluene was used. The antiglare layer-forming coating liquid was coated on the triacetyl cellulose film as a transparent substrate by a die coating method using a die coater as shown in FIG. 5 to form a coated film. After forming the coated film, the solvent was evaporated with a drying apparatus followed by the irradiation of ultraviolet rays of 400 mJ under an atmosphere of the oxygen concentration of 0.03% or less by using the high-pressure mercury lamp to form an antiglare layer. By way of the processes, an antiglare film provided with an antiglare layer on a transparent substrate was prepared.

Comparative Example 1

An antiglare film provided with an antiglare layer on a transparent substrate was prepared in the same way as in Example 1, except that the particles A and the particles B in Example 1 were replaced with particles A and particles B as shown in Comparative Example 1 in Table 1.

Comparative Example 2

An antiglare film provided with an antiglare layer on a transparent substrate was prepared in the same way as in Example 1, except that the particles A and the particles B in Example 1 were replaced with particles A and particles B as shown in Comparative Example 2 in Table 1.

Example 2

An antiglare film provided with an antiglare layer on a transparent substrate was prepared in the same way as in Example 1, except that the particles A and the particles B in Example 1 were replaced with particles A and particles B as shown in Example 2 in Table 1.

Comparative Example 3

An antiglare film provided with an antiglare layer on a transparent substrate was prepared in the same way as in Example 1, except that the particles A and the particles B in Example 1 were replaced with particles A and particles B as shown in Comparative Example 3 in Table 1.

Example 3

An antiglare film provided with an antiglare layer on a transparent substrate was prepared in the same way as in Example 1, except that the particles A and the particles B in Example 1 were replaced with particles A and particles B as shown in Example 3 in Table 1.

Comparative Example 4

An antiglare film provided with an antiglare layer on a transparent substrate was prepared in the same way as in Example 1, except that the particles A and the particles B in Example 1 were replaced with particles A and particles B as shown in Comparative Example 4 in Table 1.

Example 4

An antiglare film provided with an antiglare layer on a transparent substrate was prepared in the same way as in Example 1, except that the particles A and the particles B in Example 1 were replaced with particles A and particles B as shown in Example 4 in Table 1.

Comparative Example 5

An antiglare film provided with an antiglare layer on a transparent substrate was prepared in the same way as in Example 1, except that the particles A and the particles B in Example 1 were replaced with particles A and particles B as shown in Comparative Example 5 in Table 1.

Example 5

An antiglare film provided with an antiglare layer on a transparent substrate was prepared in the same way as in Example 1, except that the particles A and the particles B in Example 1 were replaced with particles A and particles B as shown in Example 5 in Table 1.

Comparative Example 6

An antiglare film provided with an antiglare layer on a transparent substrate was prepared in the same way as in Example 1, except that the particles A and the particles B in Example 1 were replaced with particles A and particles B as shown in Comparative Example 6 in Table 1.

Materials, parts by weight and average particle diameters ($r_A$, $r_B$) of particles A and particles B used in Examples 1-5 and Comparative Examples 1-6, and the average thickness (H) of formed antiglare layers are shown in Table 1. The average particle diameters ($r_A$, $r_B$) of the particles A and the particles B were measured with a light scattering type particle size distribution measurement apparatus (SALD-7000, by SHIMADZU) The average thickness of an antiglare layer was measured with an electronic micrometer (K351C, by Anritsu).

TABLE 1

| | | | Particle | | (μm) | Part by weight | Average thickness (H) (μm) |
|---|---|---|---|---|---|---|---|
| Exam. 1 | Particle A | Filler A | Average particle diameter ($r_A$) | | 1.5 | 10 | 4.9 |
| | Particle B | Filler B | Average particle diameter ($r_B$) | | 4.0 | 5 | |
| Comp. Exam. 1 | Particle A | Filler A | Average particle diameter ($r_A$) | | 2.3 | 10 | 4.6 |
| | Particle B | Filler B | Average particle diameter ($r_B$) | | 3.5 | 5 | |
| Comp. Exam. 2 | Particle A | Filler A | Average particle diameter ($r_A$) | | 1.5 | 10 | 6.2 |
| | Particle B | Filler B | Average particle diameter ($r_B$) | | 6.3 | 5 | |
| Exam. 2 | Particle A | Filler A | Average particle diameter ($r_A$) | | 1.5 | 10 | 5.8 |
| | Particle B | Filler B | Average particle diameter ($r_B$) | | 5.0 | 5 | |
| Comp. Exam. 3 | Particle A | Filler A | Average particle diameter ($r_A$) | | 1.5 | 10 | 7.2 |
| | Particle B | Filler B | Average particle diameter ($r_B$) | | 7.5 | 5 | |
| Exam. 3 | Particle A | Filler A | Average particle diameter ($r_A$) | | 1.5 | 10 | 4.4 |
| | Particle B | Filler B | Average particle diameter ($r_B$) | | 3.0 | 5 | |
| Comp. Exam. 4 | Particle A | Filler A | Average particle diameter ($r_A$) | | 1.5 | 10 | 4.2 |
| | Particle B | Filler B | Average particle diameter ($r_B$) | | 2.3 | 5 | |
| Exam. 4 | Particle A | Filler A | Average particle diameter ($r_A$) | | 2.0 | 10 | 5.3 |
| | Particle B | Filler B | Average particle diameter ($r_B$) | | 4.0 | 5 | |
| Comp. Exam. 5 | Particle A | Filler A | Average particle diameter ($r_A$) | | 2.3 | 10 | 5.2 |
| | Particle B | Filler B | Average particle diameter ($r_B$) | | 4.0 | 5 | |
| Exam. 5 | Particle A | Filler A | Average particle diameter ($r_A$) | | 1.0 | 10 | 4.7 |
| | Particle B | Filler B | Average particle diameter ($r_B$) | | 4.0 | 5 | |
| Comp. Exam. 6 | Particle A | Filler A | Average particle diameter ($r_A$) | | 0.7 | 10 | 45 |
| | Particle B | Filler B | Average particle diameter ($r_B$) | | 4.0 | 5 | |

In the Table:
Filler A: acrylic spherical filler
Filler B: acrylic/styrene copolymer spherical filler

Example 6

For a transparent substrate, a triacetyl cellulose film (TD-80U, by FUJIFILM) was used. For an antiglare layer-forming coating liquid, a liquid containing 100 parts by weight of PE3 (pentaerythritol acrylate, by KYOEISHA CHEMICAL), 5 parts by weight of Irgacure 184 (ultraviolet ray polymerization initiator, by Ciba Specialty Chemicals), particles C (silica aggregates amorphous filler) in an aggregated state formed by the aggregation of primary particles (fine particles) as shown in Table 2 and 110 parts by weight of toluene was used. The antiglare layer-forming coating liquid was coated on the triacetyl cellulose film (a transparent substrate) by a die coating method using a die coater as shown in FIG. 5 to form a coated film. After forming the coated film, the solvent was evaporated with a drying apparatus followed by the irradiation of ultraviolet rays of 400 mJ under an atmosphere of the oxygen concentration of 0.03% or less by using the high-pressure mercury lamp to form an antiglare layer. By way of the processes, an antiglare film provided with an antiglare layer on a transparent substrate was prepared.

Comparative Example 7

An antiglare film provided with an antiglare layer on a transparent substrate was prepared in the same way as in Example 6, except that the particles C in an aggregated state in Example 6 was replaced with particles C in an aggregated state as shown in Comparative Example 7 in Table 2.

Comparative Example 8

An antiglare film provided with an antiglare layer on a transparent substrate was prepared in the same way as in Example 6, except that the particles C in an aggregated state in Example 6 was replaced with particles C in an aggregated state as shown in Comparative Example 8 in Table 2.

Example 7

An antiglare film provided with an antiglare layer on a transparent substrate was prepared in the same way as in Example 6, except that the particles C in an aggregated state in Example 6 was replaced with particles C in an aggregated state as shown in Example 7 in Table 2.

Comparative Example 9

An antiglare film provided with an antiglare layer on a transparent substrate was prepared in the same way as in Example 6, except that the particles C in an aggregated state in Example 6 was replaced with particles C in an aggregated state as shown in Comparative Example 9 in Table 2.

Example 8

An antiglare film provided with an antiglare layer on a transparent substrate was prepared in the same way as in Example 6, except that the particles C in an aggregated state in Example 6 was replaced with particles C in an aggregated state as shown in Example 8 in Table 2.

Comparative Example 10

An antiglare film provided with an antiglare layer on a transparent substrate was prepared in the same way as in Example 6, except that the particles C in an aggregated state in Example 6 was replaced with particles C in an aggregated state as shown in Comparative Example 10 in Table 2.

Example 9

An antiglare film provided with an antiglare layer on a transparent substrate was prepared in the same way as in Example 6, except that the particles C in an aggregated state in Example 6 was replaced with particles C in an aggregated state as shown in Example 9 in Table 2.

Comparative Example 11

An antiglare film provided with an antiglare layer on a transparent substrate was prepared in the same way as in Example 6, except that the particles C in an aggregated state in Example 6 was replaced with particles C in an aggregated state as shown in Comparative Example 11 in Table 2.

Example 10

An antiglare film provided with an antiglare layer on a transparent substrate was prepared in the same way as in Example 6, except that the particles C in an aggregated state in Example 6 was replaced with particles C in an aggregated state as shown in Example 10 in Table 2.

Comparative Example 12

An antiglare film provided with an antiglare layer on a transparent substrate was prepared in the same way as in Example 6, except that the particles C in an aggregated state in Example 6 was replaced with particles C in an aggregated state as shown in Comparative Example 12 in Table 2.

Materials, parts by weight, average diameters of primary particles (primary particle diameter: $r_{C1}$) and average diameters of particles C in an aggregated state (secondary particle diameter: $r_{C2}$) used in Examples 6-10 and Comparative Examples 7-12, and the average thickness (H) of formed antiglare layers are shown in Table 2. The average particle diameter of primary particles for the particle C in an aggregated state (primary particle diameter: $r_{C1}$) and the average particle diameter of particles C in an aggregated state (secondary particle diameter: $r_{C2}$) were measured with a light scattering type particle size distribution measurement apparatus (SALD-7000, by SHIMADZU). The average thickness of an antiglare layer was measured with an electronic micrometer (K351C, by Anritsu).

TABLE 2

| | | | Particle | | | Average thickness (H) |
|---|---|---|---|---|---|---|
| | | | | (μm) | Part by weight | (μm) |
| Exam. 6 | Particle C | Filler C | Primary particle diameter ($r_{C1}$) | 0.02 | 10 | 3.8 |
| | | | Secondary particle diameter ($r_{C2}$) | 2.2 | | |

TABLE 2-continued

| | | | Particle | (μm) | Part by weight | Average thickness (H) (μm) |
|---|---|---|---|---|---|---|
| Comp. Exam. 7 | Particle C | Filler C | Primary particle diameter ($r_{C1}$) | 0.04 | 10 | 3.8 |
| | | | Secondary particle diameter ($r_{C2}$) | 2.2 | | |
| Comp. Exam. 8 | Particle C | Filler C | Primary particle diameter ($r_{C1}$) | 0.02 | 10 | 4.4 |
| | | | Secondary particle diameter ($r_{C2}$) | 3.6 | | |
| Exam. 7 | Particle C | Filler C | Primary particle diameter ($r_{C1}$) | 0.03 | 10 | 3.8 |
| | | | Secondary particle diameter ($r_{C2}$) | 2.2 | | |
| Comp. Exam. 9 | Particle C | Filler C | Primary particle diameter ($r_{C1}$) | 0.05 | 10 | 3.9 |
| | | | Secondary particle diameter ($r_{C2}$) | 2.2 | | |
| Exam. 8 | Particle C | Filler C | Primary particle diameter ($r_{C1}$) | 0.005 | 10 | 3.8 |
| | | | Secondary particle diameter ($r_{C2}$) | 2.2 | | |
| Comp. Exam. 10 | Particle C | Filler C | Primary particle diameter ($r_{C1}$) | 0.003 | 10 | 3.8 |
| | | | Secondary particle diameter □ ($r_{C2}$) | 2.2 | | |
| Exam. 9 | Particle C | Filler C | Primary particle diameter ($r_{C1}$) | 0.02 | 10 | 4.1 |
| | | | Secondary particle diameter ($r_{C2}$) | 3.0 | | |
| Comp. Exam. 11 | Particle C | Filler C | Primary particle diameter ($r_{C1}$) | 0.02 | 10 | 4.6 |
| | | | Secondary particle diameter ($r_{C2}$) | 3.9 | | |
| Exam. 10 | Particle C | Filler C | Primary particle diameter ($r_{C1}$) | 0.02 | 10 | 3.6 |
| | | | Secondary particle diameter ($r_{C2}$) | 1.5 | | |
| Comp. Exam. 12 | Particle C | Filler C | Primary particle diameter ($r_{C1}$) | 0.02 | 10 | 3.5 |
| | | | Secondary particle diameter ($r_{C2}$) | 1.2 | | |

In the Table:
Filler C: silica aggregate amorphous filler

For the antiglare films obtained in Examples and Comparative Example, the 5° reflectance of the antiglare film surface, the arithmetic average roughness ($Ra_1$) when the cutoff wavelength was 0.008 mm, and the arithmetic average roughness ($Ra_2$) when the cutoff wavelength was 0.8 mm were measured by following methods. Further, antiglare property and white blurring were evaluated by the following methods.

<5° Reflectance>

The surfaces on the triacetyl cellulose film side of the antiglare films obtained in Examples and Comparative Examples were coated with matting black spray, and the 5° reflectance of the surface on the antiglare layer-formed side of the antiglare film was measured with a reflectance measuring apparatus (U-4000/integrating sphere system/measuring wavelength 550 nm, by Hitachi High-Technologies).

<Arithmetic Average Roughness ($Ra_1$) when Cutoff Wavelength is 0.008 mm>

The surfaces on the antiglare layer-formed side of the antiglare films obtained in Examples and Comparative Examples were measured with a high accuracy micro figure-measuring instrument (Surfcoder ET4000A, by Kosaka Laboratory) on the basis of JIS-B0601-1994 at a cutoff wavelength ($\lambda_c$) of 0.008 mm, an evaluation length of 0.8 mm, and a scanning speed of 0.005 mm/sec to obtain $Ra_1$.

<Arithmetic Average Roughness ($Ra_2$) when Cutoff Wavelength is 0.8 mm>

The surfaces on the antiglare layer-formed side of the antiglare films obtained in Examples and Comparative Examples were measured with a high accuracy micro figure-measuring instrument (Surfcoder ET4000A, by Kosaka Laboratory) on the basis of JIS-B0601-1994 at a cutoff wavelength ($\lambda_c$) of 0.8 mm, an evaluation length of 0.8 mm, and a scanning speed of 0.005 mm/sec to obtain $Ra_2$.

<Evaluation Method of Antiglare Property>

In a state where the surfaces on the triacetyl cellulose film side of the antiglare films obtained in Examples and Comparative Examples were laminated onto a black plastic plate, light from a fluorescent lamp was shone onto the antiglare layer-formed surface of the antiglare film to evaluate visually the sharpness of the image of the shone fluorescent lamp. As the result of the visual evaluation, a case where the image of the fluorescent lame does not bother at all a viewer is denoted by "o", and a case where the image of the fluorescent lame is sharp and bothers a viewer is denoted by "x".

<Method of Evaluating White Blurring>

In a state where the surfaces on the triacetyl cellulose film side of the antiglare films obtained in Examples and Comparative Examples were laminated onto a black plastic plate, light from a fluorescent lamp was shone onto the antiglare layer-formed surface of the antiglare film to be evaluated visually. On this occasion, a case where the diffusion degree of the light of the fluorescent lamp shone onto the antiglare film surface is low not to make the antiglare film be felt whitish is denoted by "o", and a case where the surface appears whitish to such a degree as not to be allowed is denoted by "x".

Table 3 shows the measurement results of the 5° reflectance, the arithmetic average roughness ($Ra_1$) when the cutoff wavelength is 0.008 mm and the arithmetic average roughness ($Ra_2$) when the cutoff wavelength is 0.8 mm, and the evaluation results of the antiglare property and the white blurring for the antiglare films obtained in Examples 1-5 and Comparative Examples 1-6. Table 3 also shows $r_A/H$ obtained by dividing the average particle diameter ($r_A$) of the particles A by the average thickness (H) of the formed antiglare layer, and $r_B/H$ obtained by dividing the average particle diameter ($r_B$) of the particles B by the average thickness (H) of the formed antiglare layer.

TABLE 3

| | $r_A/H$ | $r_B/H$ | 5° reflectance (%) | $Ra_1$ (μm) | $Ra_2$ (μm) | White blurring | Antiglare property |
|---|---|---|---|---|---|---|---|
| Exam. 1 | 0.31 | 0.82 | 0.48 | 0.030 | 0.41 | o | o |
| Comp. Exam. 1 | 0.50 | 0.76 | 0.35 | 0.050 | 0.43 | x | o |
| Comp. Exam. 2 | 0.24 | 1.02 | 0.36 | 0.028 | 0.46 | x | o |
| Exam. 2 | 0.26 | 0.86 | 0.41 | 0.029 | 0.43 | o | o |
| Comp. Exam. 3 | 0.21 | 1.04 | 0.28 | 0.029 | 0.51 | x | o |
| Exam. 3 | 0.34 | 0.68 | 0.57 | 0.032 | 0.38 | o | o |
| Comp. Exam. 4 | 0.36 | 0.55 | 0.72 | 0.031 | 0.28 | o | x |
| Exam. 4 | 0.38 | 0.75 | 0.35 | 0.040 | 0.42 | o | o |
| Comp. Exam. 5 | 0.44 | 0.77 | 0.22 | 0.051 | 0.44 | x | o |
| Exam. 5 | 0.21 | 0.85 | 0.60 | 0.024 | 0.41 | o | o |
| Comp. Exam. 6 | 0.16 | 0.89 | 0.79 | 0.019 | 0.37 | o | x |

Table 4 shows the measurement results of the 5° reflectance, the arithmetic average roughness ($Ra_1$) when the cutoff wavelength is 0.008 mm and the arithmetic average roughness ($Ra_2$) when the cutoff wavelength is 0.8 mm, and the evaluation results of the antiglare property and the white blurring for the antiglare films obtained in Examples 6-10 and Comparative Examples 7-12. Table 4 also shows $r_{C1}$ being the average particle diameter of primary articles for the particles C (primary particle diameter $r_{C1}$), and $r_{C2}/H$ obtained by dividing $r_{C2}$ being the average particle diameter of the particles C in an aggregated state (secondary particle diameter $r_{C2}$) by the average thickness (H) of the formed antiglare layer.

TABLE 4

| | $r_{C1}$ (μm) | $r_{C2}/H$ | 5° reflectance (%) | $Ra_1$ (μm) | $Ra_2$ (μm) | White blurring | Antiglare property |
|---|---|---|---|---|---|---|---|
| Exam. 6 | 0.020 | 0.58 | 0.49 | 0.031 | 0.39 | o | o |
| Comp. Exam. 7 | 0.040 | 0.58 | 0.31 | 0.042 | 0.44 | x | o |
| Comp. Exam. 8 | 0.020 | 0.82 | 0.31 | 0.032 | 0.48 | x | o |
| Exam. 7 | 0.030 | 0.58 | 0.37 | 0.038 | 0.42 | o | o |
| Comp. Exam. 9 | 0.050 | 0.56 | 0.26 | 0.050 | 0.45 | x | o |
| Exam. 8 | 0.005 | 0.58 | 0.58 | 0.028 | 0.38 | o | o |
| Comp. Exam. 10 | 0.003 | 0.58 | 0.74 | 0.018 | 0.37 | o | x |
| Exam. 9 | 0.020 | 0.73 | 0.45 | 0.033 | 0.42 | o | o |
| Comp. Exam. 11 | 0.020 | 0.85 | 0.26 | 0.032 | 0.47 | x | o |
| Exam. 10 | 0.020 | 0.42 | 0.60 | 0.033 | 0.36 | o | o |
| Comp. Exam. 12 | 0.020 | 0.34 | 0.78 | 0.031 | 0.29 | o | x |

What is claimed is:

1. An antiglare film comprising an antiglare layer on a transparent substrate, wherein:
    the antiglare layer has a rugged structure on a surface opposite to the transparent substrate;
    a 5° reflectance of the antiglare film surface with the rugged structure is in the range of from 0.30% to 0.70%;
    the rugged structure has an arithmetic average roughness ($Ra_1$) in the range of 0.020 μm to 0.040 μm when a cutoff wavelength ($\lambda_C$) is 0.008 mm; and
    the rugged structure has an arithmetic average roughness ($Ra_2$) in the range of 0.35 μm to 0.45 μm when the cutoff wavelength ($\lambda_C$) is 0.8 mm.

2. The antiglare film according to claim 1, wherein:
    the antiglare layer comprises a binder matrix, particles (A) and particles (B), the average particle diameter for particles (A) is different from that for particles (B);
    the average particle diameter ($r_A$) of the particles (A) is in the range of a value obtained by multiplying the average thickness (H) of the antiglare layer by 0.20 to a value obtained by multiplying the average thickness (H) of the antiglare layer by 0.40; and
    the average particle diameter ($r_B$) of the particles (B) is in the range of a value obtained by multiplying the average thickness (H) of the antiglare layer by 0.60 to the average thickness (H) of the antiglare layer.

3. The antiglare film according to claim 1, wherein:
    the antiglare layer comprises a binder matrix and particles (C), wherein each particle (C) is an aggregated figure formed by an aggregation of primary particles there are;
    the average particle diameter ($r_{C1}$) of the primary particles is in the range of 0.005 μm to 0.03 μm; and
    the average particle diameter ($r_{C2}$) of the particles C is in the range of a value obtained by multiplying the average thickness (H) of the antiglare layer by 0.35 to a value obtained by multiplying the average thickness (H) of the antiglare layer by 0.80.

4. A transmissive liquid crystal display comprising the antiglare film as described in claims 1, and arranged in that order from said antiglare film, a first polarizing plate, a liquid crystal cell, a second polarizing plate and a backlight unit.

* * * * *